United States Patent Office 3,012,142
Patented Dec. 5, 1961

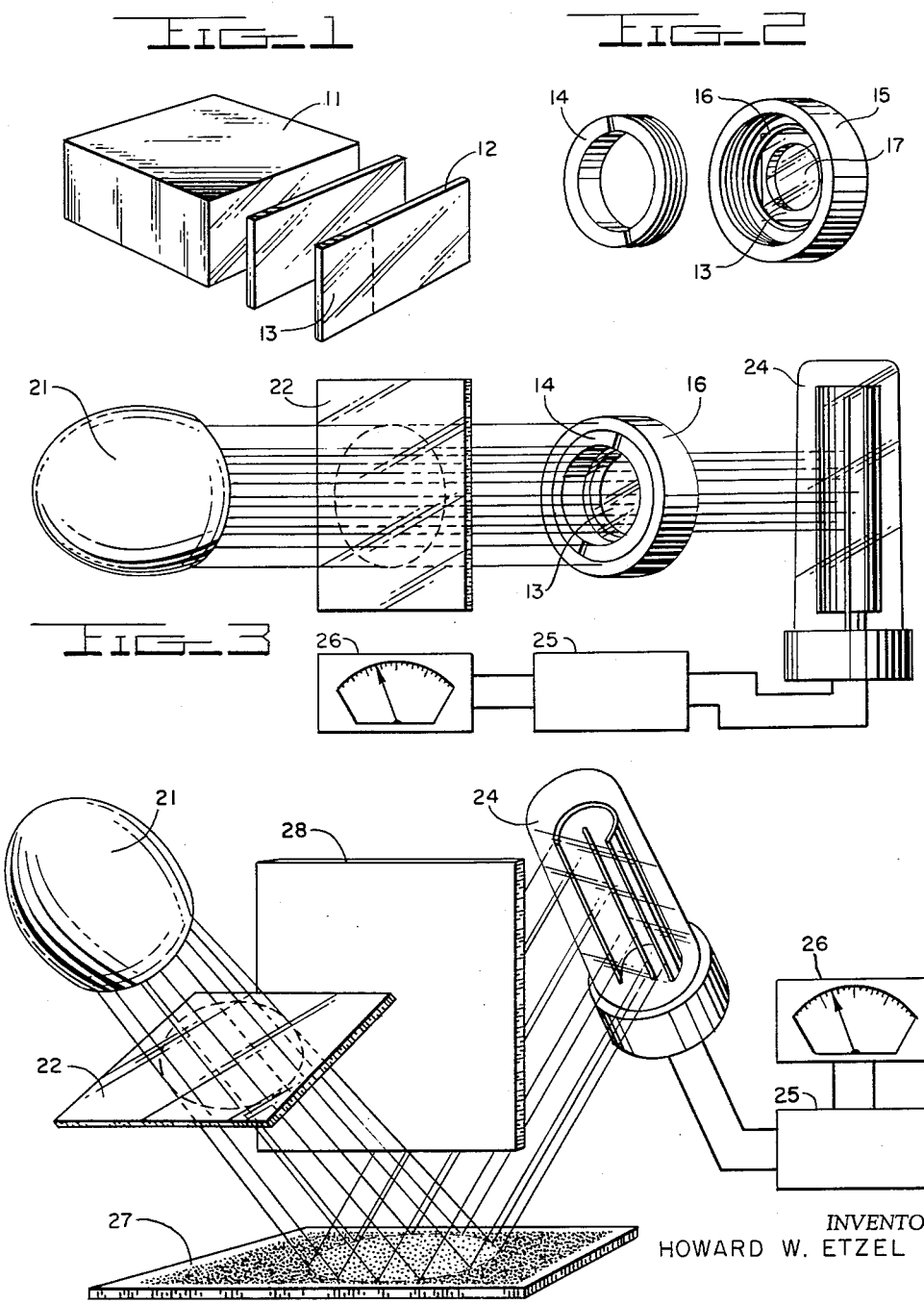

3,012,142
HIGH TEMPERATURE DOSIMETER
Howard W. Etzel, 335 Onondaga Drive,
Forest Heights, Md.
Filed Mar. 30, 1959, Ser. No. 803,040
8 Claims. (Cl. 250—83)
(Granted under Title 35, U.S. Code (1952), sec. 266)

The invention described herein may be manufactured and used by or for the Government of the United States of America for governmental purposes without the payment of any royalties thereon or therefor.

The present invention relates to a high temperature dosimeter, more specifically, to a dosimeter capable of accumulating doses of radiation at high temperatures. The present invention also pertains to the radiation measuring device which utilizes the present dosimeter for detecting and measuring radiation.

In most methods heretofore employed in dosimetry, for instance those requiring films, chemical solutions, discoloration of glasses and crystals, decomposition of certain gases, or the creation of luminescence response in solids, the detecting element thereof does not respond effectively at elevated temperatures. A specially constructed ion chamber which has found application in dosimetry above room temperature, records the radiation received over a time interval, but this device does not provide a permanent record of all the impinging radiation, for the dosage is erased at every reading. Other devices and methods proposed are not adaptable for mass distribution because of complicated procedures and elaborate instrumentation that are required to indicate the dosage.

While the disclosure that follows is specially concerned with a dosimeter capable of accumulating dosages of ionizing radiation at elevated temperatures, its relative simplicity and effectiveness as a device for detecting and measuring ionizing radiation makes it a useful tool to dosimetry in general.

An important object of the present invention is in the provision of a radiation detecting element that can be positioned in a high temperature zone and can detect effectively radiation emanating from within the high temperature zone. The term "radiation" herein refers generically to penetrating radiation such as, ultraviolet, X rays, gamma rays and also to particle energy, such as electrons. A collateral object of the present invention is to provide a suitable dosimeter device of the character described herein which is capable of measuring penetrating ionizing radiation.

Another object of the present invention is to provide a dosimeter in which doses of penetrating ionizing radiation are permanently and irreversibly recorded at temperatures as high as 400° C.

A further object of the invention is to provide a detecting element for indicating the dosage of radiation received from a single exposure or from a series of exposures.

In connection with the foregoing objects the novel dosimeter herein disclosed may be used to detect and measure wide dosages of radiation by visual inspection of the color intensity of an irradiated crystal, and for greater accuracy, the irradiated crystal may be placed in various measuring systems and the radiation received may be quantitatively indicated.

Other objects and attendant advantages of the present invention will become apparent upon a careful consideration of the following detailed description when taken in connection with the accompanying drawings wherein:

FIGURE 1 shows a wafer-thin crystal detecting element of the present invention sliced from a single crystal ingot;

FIGURE 2 shows the crystal detecting element mounted in a convenient holder;

FIGURE 3 is a somewhat schematic plan of the detecting element in a measuring system which determines the amount of light transmitted by the irradiated, color-bearing crystal;

FIGURE 4 is a somewhat schematic plan of the detecting element in the form of a plaque in a measuring system which determines the amount of light reflected from the irradiated, color-bearing crystal plaque.

In principle the operation of the novel dosimeter depends on the coloration imparted to an otherwise colorless crystal composition, the intensity of the color acquired being proportional to the amount of penetrating ionizing radiation received by the crystal. The crystal consists of an alkali halide composition, preferably sodium chloride, in which the crystal structure has been modified or altered to a certain extent, in the manner described below, whereby this specific crystal composition which is ordinarily colorless turns purple in color under the influence of ionizing radiation and after heating the irradiated crystal to a temperature of about 300° C. The intensity of color produced in the crystal is substantially proportional to the amount of radiation to which the crystal has been exposed; the deeper the purple color or that develops after heating, the greater is the radiation dosage which the crystal has received. In order for an irradiated sodium chloride crystal to produce the purple color relative to the dosage of radiation received, said crystal must be subjected to a temperature of about 300° C. The heating step may be carried out concurrently with the irradiation in a heated zone of 300° C. or more, in which case the crystal composition of the present invention becomes a convenient high temperature dosimeter. In other instances where the temperature in the irradiated zone is insufficient to produce coloration, the crystal must be heated subsequent to irradiation to a temperature of about 300° C. until the color has developed. It must be understood, however, that the heating accompanying the irradiation or which is undertaken at any time following irradiation is required only for the purpose of bringing out the purple color in the crystal; the intensity of the purple color depends on the dosage of radiation which the crystal has received. Furthermore, the intensity of the purple color in the crystal is not affected by temperature in the range of 300 to 400° C. or even more, nor generally by the duration of heating, except for a slight increase in color intensity which appears only after prolonged heating.

In order for a colorless alkali halide crystal to become operative as a radiation indicator in which a color change can take place, the alkali halide is initially produced as a single crystal ingot with hydroxyl ions (OH⁻) present in the crystal lattice thereof; the novel crystal composition is then further treated at a high temperature in an alkali metal atmosphere and slowly cooled to room temperature. In general, the crystal composition which is produced by this treatment contains substantially no F-centers, but the crystal is capable of forming F-centers whenever it is exposed to ionizing radiation. The initial suppression of F-centers in the crystal composition and the subsequent exposure of the crystal to radiation to produce F-centers therein forms an important concept of the present invention.

It has now been found that in order for a clear, colorless or nearly colorless NaCl crystal to form the purple or violet color, a certain amount of hydroxyl ion is introduced into the crystal lattice during the crystal growth. The method of producing hydroxyl ion-doped crystals, and the appreciation of the presence and influence of the hydroxyl ion in the alkali halides, forms the subject matter of a copending patent application filed of even date herewith that becomes the basis on which a treated crystal may be used as a dosimeter in accordance with the teachings of the present invention. An alkali halide crystal is grown containing a selected concentration of hydroxyl ions, said ions probably occupying one or more negative ion vacancies in the crystal lattice. The hydroxyl ion-doped crystal is treated by baking it in an atmosphere of alkali metal; the alkali metal used for this purpose may be the one forming the cations of the crystal, or any of the other alkali metals may also be used for this purpose. It is believed that as a result of this baking operation, some of the hydroxyl ions are dissociated by the alkali metal atoms and a significant concentration of hydride ions ($H^-$) appears in the crystal lattice. Another product of dissociation of the hydroxyl ion is oxygen which in conjunction with other hydroxyl or by itself prevents the reversion of F-centers to hydride, after F-centers are formed in the crystal under the stimulus of radiation. Crystals that are prepared by the method disclosed in the aforementioned patent application contain in their crystal lattice $H^-$, oxygen, and Na atoms and as a result of these constituents the crystals are sensitized to radiation energy greater than about 6 e.v. and undergo changes which are not fully understood but which nevertheless are visibly demonstrated as a result of the coloration accompanying an irradiated and heat-treated crystal.

As an illustration in the manner in which the dosimeter may be formed and used, the crystal 11, illustrated in FIGURE 1, is grown from a melt of pure sodium chloride by any convenient method, for instance, the Kyropoulos technique may be conveniently used for growing a single crystal. The growth is accomplished in the presence of moist air in order to add hydroxyl ions to the growing crystal from the water molecules normally present in air. Single crystals grown in the presence of moist air have on the average a hydroxyl ion concentration of about 30 p.p.m. based on the halide ion. Reasonable concentrations of $OH^-$ which can be incorporated in this manner and which have been found operative for the purposes of this invention are from about 10 to 100 parts per million of hydroxyl ions to chloride ions.

The sodium chloride crystal grown in this manner is then baked in a sealed container in the presence of sodium vapor. A crystal ingot of about 1 cc. in size requires a few tenths of a gram of sodium to provide metal vapor in excess of the amount necessary for vapor pressure equilibrium at the baking temperature. The crystal is baked in sodium atmosphere at 650° C. for about 18 hours. The baking operation can be completed in much less time depending on the baking temperature, i.e., 2 hours has been found sufficient for baking the crystal when the temperature is maintained at 750° C. For better optical results, after the crystal has been baked sufficiently in sodium vapor, it is cooled slowly to room temperature. (Slow cooling prevents the formation of F-centers.) The 1 cc. crystal ingot requires approximately 6 hours of cooling for optimum results. During the baking operation the $OH^-$ dissociates and the $H^-$ and oxygen formed remain in the lattice. A certain amount of sodium enters the crystal during the baking operation which results in a stoichiometric excess of sodium in the crystal in the atomic form. The NaCl crystal thus becomes sensitized to radiation and may now be prepared for use as a dosimeter.

In FIGURE 1, the single crystal ingot 11 is cut into wafer-thin sections 12 about 0.5 mm. in thickness. Relatively thin crystal sections are required due to the high absorption coefficient of the purple band produced by the radiation. The sections are clear and nearly colorless, except for a slightly perceptible color that may be present in view of the baking procedure which may impart a slight predose absorption and which must be initially determined. This predose absorption in the purple or violet band at 565 m$\mu$ is subtracted from the purple light absorption which develops following irradiation in order to obtain more accurate results. The crystal section 12 is further diced into a wafer 13 about 0.5 cm.², or of any other convenient size, and mounted into a holder, as shown in FIGURE 2, for convenience in handling. The holder includes a retainer ring 14 and a cover 15 in which center opening 17 exposes one face of the crystal wafer 13. Retainer ring and cover are provided with threaded sections whereby the retainer ring is screwed into the cover portion. The crystal wafer is inserted into the cover, centered over the opening and a biasing ring 16 contacts the outer portion or corners of the wafer, thus providing a means for securing the wafer firmly against the opening 17 in the holder, when retainer ring 14 is screwed into the cover 15.

The holder with crystal wafer attached thereto is positioned in an appropriate place or attached to any convenient object and exposed to a source of radiation, for example, proximally to an atomic reactor. Following a predetermined time interval, the irradiated crystal is removed and heated to about 300° C. or more to bring out the characteristic purple color. The time interval that lapses between irradiation and heating is not critical; the heat treatment may be delayed indefinitely until a more convenient time.

After the purple color has developed, the crystal may be inspected visually or it may be placed in a measuring system and the intensity of the purple color may be indicated. In FIGURE 3 the dose measuring system converts light transmitted by the crystal into photoelectric current: Light from a source 21 passes through a suitable filter 22 which absorbs all light except a narrow band of yellow-green centered at 565 m$\mu$ which is transmitted by the crystal 13 to photo tube 24. It is desirable to pass a band of light through the filter which is of a predetermined intensity and quality so that the light transmitted by the crystal will bear a functional relationship to the dose of radiation received by the crystal. Light transmitted by the crystal impinges on the photosensitive surface within the photo tube and is converted to current. After amplification of the current, collectively designated at 25, the current passes to a metering device 26 which may be calibrated in roentgen units to indicate directly the dose of radiation received by the detecting element. If an accumulative dosage of radiation is desired, the crystal may be again positioned near the radiation source and after additional irradiation the crystal is removed, heated to develop additional coloration and again returned to the dose measuring system. The total amount of radiation which the crystal has accumulated is thus indicated.

The dose measuring system may be designed, as shown in FIGURE 4 to measure the fraction of light which is reflected from a plaque 27 formed of powdered NaCl. The powder is treated originally to include the decomposition products of the hydroxyl ion and a certain stoichiometric excess of sodium in its composition. The powder, glued onto a surface backing, develops the purple coloration upon exposure to radiation and by heating the irradiated powder plaque to about 300° C. Absorption of light in the purple band is determined by the fraction of light reflected from the purple plaque. Light from tungsten source 21, passing through filter 22, is reflected from plaque 27, and the reflected light is detected by photo tube 24. A screen 28 demonstrates a means for limiting stray incident light. Amplification means designated by block 25 raises the signal impressed on the tube to a useful level and a meter 26 provides a visual indication of the current signal. The meter is calibrated to read the dose in roentgens received by the dosimeter.

In providing a new dosimeter, certain advantages should be pointed out which make it a particularly useful addition in the art: The color developed by the crystal is stable—it does not fade out or become altered by exposure to sunlight or other radiation, and it can withstand temperatures well above 400° C. In this regard, the dosimetry value is not affected by temperature during exposure to radiation or following irradiation. The crystal displays identical results to a given radiation dose at 300–400° C. and at normal room temperature and below. Of course, the practical value of a dosimeter is indicated by its ability to discriminate varying dosages of radiation over a sufficiently wide range. The present dosimeter is capable of measuring dosages of from about $10^4$ to about $10^7$ roentgens of radiation. The operable range may be further extended by incorporating in the crystal structure a larger concentration of hydroxyl ion.

It is now believed that stable coloration of the NaCl crystal, as it now occurs in the present invention results from an aggregation of sodium atoms in the interior of the crystal. Hydride ions formed from hydroxyl ions are irreversibly transformed by radiation to F-centers. Under the stimulus of heat F-centers form the colloidal dispersion which is responsible for the purple color imparted to the crystal. The sensitivity of the dosimeter moreover depends primarily on the OH$^-$ concentration which was originally present in the crystal structure.

It may be apparent to one skilled in the art that the present invention is by no means limited to the particular organization shown and described, but that many modifications may be made without departing from the scope of the invention as set forth in the appended claims.

What is claimed is:

1. A dosimeter for the detection and measurement of ionizing radiation consisting of a substantially colorless crystal formed of an alkali halide having in its crystal structure a selected concentration of hydroxyl ions, their dissociation products, and a stoichiometric excess of alkali metal, said selected concentration being sufficient to cause the colorless crystal to become permanently colored following irradiation and heating of the crystal to a temperature of about 300° C.

2. The dosimeter as claimed in claim 1, plus means for heating said crystal to said temperature.

3. A dosimeter for the detection and measurement of ionizing radiation consisting of a substantially colorless crystal formed of sodium chloride having in its crystal structure a selected concentration of hydroxyl ions, their dissociation products, and a stoichiometric excess of alkali metal, said selected concentration being sufficient to cause the colorless crystal to undergo a purple coloration following irradiation and heating of the crystal to a temperature of about 300° C.

4. The dosimeter as claimed in claim 3, plus means for heating said crystal to said temperature.

5. A dosimeter for the detection and measurement of ionizing radiation consisting of a substantially colorless crystal formed of sodium chloride having in its crystal structure a selected concentration of hydroxyl ions, their dissociation products, and a stoichiometric excess of alkali metal, said selected concentration being sufficient to cause the colorless crystal to undergo a purple coloration following irradiation and heating of the crystal to a temperature of about 300° C., means for directing a narrow band of yellow-green light onto said crystal, means for converting light transmitted by said crystal to electrical signal proportional to the intensity of light, plus means for measuring the magnitude of the electrical signal.

6. A dosimeter for the detection and measurement of ionizing radiation consisting of a substantially colorless crystal formed of sodium chloride having in its crystal structure a selected concentration of hydroxyl ions, their dissociation products, and a stoichiometric excess of alkali metal, said selected concentration being sufficient to cause the colorless crystal to undergo a purple coloration following irradiation and heating of the crystal to a temperature of about 300° C., means for directing a narrow band of yellow-green light onto said crystal, means for converting light transmitted by said crystal to electrical signal proportional to the intensity of light, means for amplifying said electrical signal, plus means for measuring the magnitude of the electrical signal.

7. A dosimeter for the detection and measurement of ionizing radiation consisting of substantially colorless crystals formed into a plaque, said crystals formed of an alkali halide having in its crystal structure a selected concentration of hydroxyl ions, their dissociation products, and a stoichiometric excess of alkali metal, said selected concentration being sufficient to cause the colorless alkali halide crystals in the plaque to become permanently colored following irradiation and heating of the plaque to a temperature of about 300° C.

8. A dosimeter as claimed in claim 7, transmitted by said crystal plus means for converting light to electrical signal proportional to the intensity of light, means for amplifying said electrical signal, and means for measuring the magnitude of the electrical signal.

References Cited in the file of this patent

UNITED STATES PATENTS

| | | |
|---|---|---|
| 2,673,934 | Friedman | Mar. 30, 1954 |
| 2,689,308 | Land | Sept. 14, 1954 |
| 2,752,509 | Fritzgerald et al. | June 26, 1956 |
| 2,757,292 | Schulman et al. | July 31, 1956 |
| 2,761,070 | Moos | Aug. 28, 1956 |
| 2,763,786 | Mauer et al. | Sept. 18, 1956 |
| 2,800,589 | Levy | July 23, 1957 |
| 2,902,605 | Wallack | Sept. 1, 1959 |

FOREIGN PATENTS

| | | |
|---|---|---|
| 17,666 | Great Britain | Sept. 24, 1903 |
| 660,719 | Great Britain | Nov. 14, 1951 |
| 743,584 | Great Britain | Jan. 18, 1956 |

OTHER REFERENCES

Schulman et al.: Measuring High Doses by Absorption Changes in Glass, Nucleonics, February 1955, pages 30–33.